UNITED STATES PATENT OFFICE.

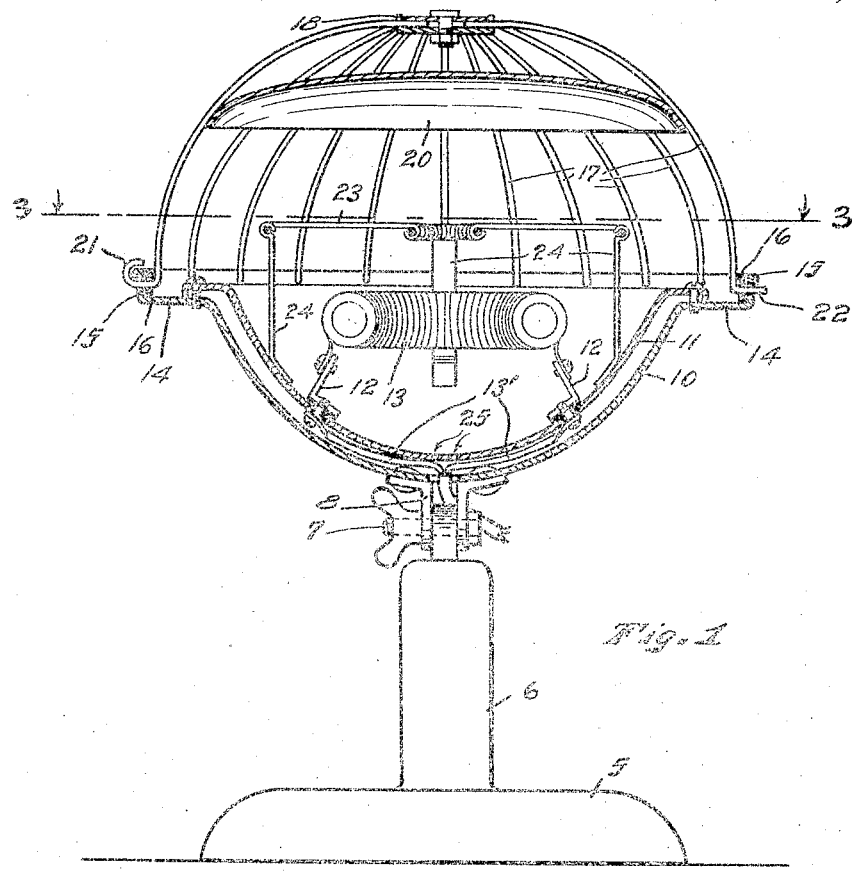
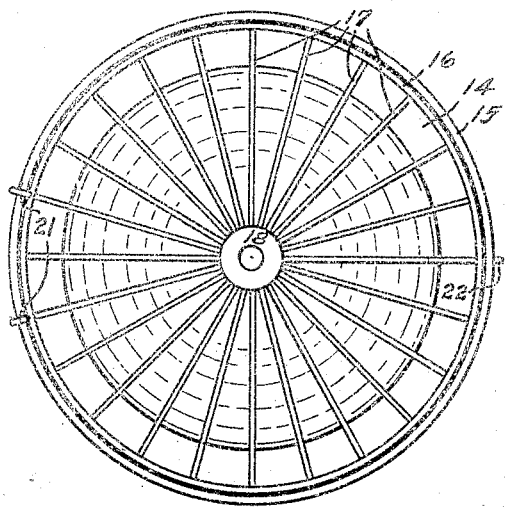
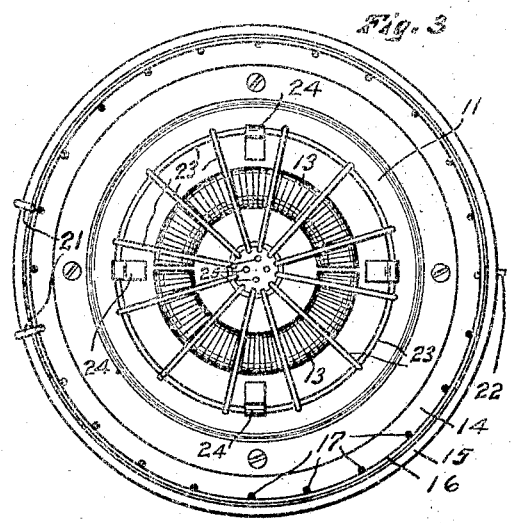

NICOLA FURFARO, OF SEATTLE, WASHINGTON.

ELECTRIC HEATER.

1,410,400.  Specification of Letters Patent.  Patented Mar. 21, 1922.

Application filed April 6, 1921. Serial No. 459,054.

*To all whom it may concern:*

Be it known that I, NICOLA FURFARO, a citizen of the United States, residing at Seattle, in the county of King and State of Washington, have invented certain new and useful Improvements in Electric Heaters, of which the following is a specification.

This invention relates to improvements in electric heaters of the type wherein an electric heating element is disposed in close proximity to a concave heat reflector by which the heat from the element is reflected outwardly and the object of this improvement is to provide an electric heater of this type having a secondary reflector by which the heat may be reflected sidewise and distributed evenly on all sides of the electric heater, the said secondary reflector being removable.

Another object is to provide an electric heater of this type that is provided above the heating element with a wire support or grid upon which cooking utensils or other articles to be heated may be placed.

With the above and other objects in view as will be apparent from the following description the invention consists in the novel construction, adaptation and combination of parts of an electric heater as will be more clearly hereinafter described and claimed.

In the accompanying drawings Figure 1 is a view in vertical mid section of an electric heater constructed in accordance with this invention, certain parts being shown in elevation. Fig. 2 is a plan view of the same and Fig. 3 is a sectional view on broken line 3, 3 of Fig. 1, parts being shown in elevation.

Like reference numerals designate like parts throughout the several views.

In the drawings I have shown an electric heater comprising a base 5 having a centrally arranged standard 6 that is connected at its upper end by a pivot 7 with a bracket 8 that is secured to the center of a concave circular housing member 10.

Disposed within the housing member 10 and preferably spaced therefrom is a concave heat reflector 11 having upwardly projecting binding posts 12 to which are secured electric heating elements 13. The binding posts 12 may be connected with circuit wires 13' in the manner shown in Fig. 1.

The electric heating elements 15 may be of any well-known form of construction but are preferably of arcuate shape as shown in Fig. 3 to afford a better distribution of heat.

The housing member 10 terminates in a flattened or shelf like peripheral portion 14 having an upwardly projecting ledge 15 within which a ring member 16 is arranged to fit, said ring member serving as a base for a heating guard consisting of a plurality of curved wires 17 that are secured at their bottom ends to the ring member 16 and at their top ends to a centrally arranged block 18.

The parts above described may be of the usual standard form of construction.

The invention resides in the provision of a secondary heat reflector 20 that is disposed within the guard formed by the wires 17 and that is arranged in such a manner as to intercept the heat that is directed upwardly by the reflector 11 and to cause such heat to be reflected sidewise from the heater in evenly distributed relation around the entire circumference of such heater thereby tending to effect an even distribution of the heat and to keep such heat near the floor of a room on which the base of the heater rests thereby warming the room more evenly than would be possible without the secondary reflector.

The guard formed by the wire cage 17 is hinged to the upper flange 15 of the housing member by permitting the ends of two of the wires 17 to project through perforations in the flange 15 as indicated at 21 and bending the ends of such wires in such a manner that when the cage is turned over to one side the wires will not become disconnected. The cage is preferably secured at a point opposite the hinge members 21 by allowing a straight end 22 of one of the wires 17 to project through a suitable perforation in the flange 15 in such a manner that it may be sprung out of said perforation by exerting an inward pressure on the wire 17.

Disposed above the heating element 13 and within the guard formed by the wire cage 17 is a wire grid or support 23 upon which cooking utensils or other devices that are to be heated may be placed, the said grid being mounted on supports 24 that may be secured in any convenient manner to the reflector 11.

The grid 23 may be of any desired size and shape and of relatively open wire construction. A circular grid of the form shown in Figs. 1 and 3 has been found very satisfactory for this use.

The grid 23 will not interfere in the least with the ordinary operation of the heater when the same is being used for heating purposes but such grid serves as a convenient and handy support upon which any object as a cooking utensil may be placed for the purpose of heating the same.

When the heater is used for heating purposes only, the guard member 17 will preferably be in the position shown in Fig. 1 thereby causing the heat that is generated from the heater to be directed outwardly on all sides in substantially horizontal direction. When the device is to be used for cooking or for heating up objects that are supported on the grid 23 the guard member will preferably be swung or turned over to one side where it will be out of the way.

When the device is used for cooking the bottom of any cooking utensil that rests on the grid 23 serves as a heat deflector to deflect heat sidewise in substantially the same manner as the secondary reflector 20 thus causing an even distribution of all heat that is not absorbed by the cooking utensil.

The reflector 11 is preferably provided at its lowermost point with one or more perforations 25 through which liquid may escape or drain if any liquid is inadvertently spilled into such reflector.

In case the device is used for broiling the secondary reflector 20 may be used above the grid 23 after the material to be broiled has been placed on such grid, the said secondary reflector tending to throw heat downwardly onto the top of the material that is being broiled.

From the foregoing description taken in connection with the accompanying drawings the plan of construction and method of operation of this heater will be readily apparent but while I have disclosed what I now consider to be the preferred embodiment of the invention it will be understood that the device shown is merely illustrative and that such changes therein may be made as are within the scope of the following claims.

What I claim is:

1. An electric heater including a concave heat reflector, a heating element disposed therein, a concave grating arranged to serve as a guard for said heating element and a secondary heat reflector disposed within said grating and arranged to direct heated air outwardly in a direction at substantially right angles to the axis of said first named reflector.

2. A device of the class described comprising a support, a concave heat reflector carried by said support, a heating element disposed within said heat reflector and a grid supported above said heating element.

3. A device of the class described comprising a concave heat reflector having centrally arranged drain openings therein, an electric heating element disposed within said heat reflector and a grid supported above said heating element.

4. A device of the class described comprising a concave heat reflector, an electric heating element supported within the central portion of said heat reflector, an open wire grid supported above said heating element and a secondary heat reflector arranged to be removably secured above said grid.

Signed at Seattle, Washington, this 31st day of March, 1921.

NICOLA FURFARO.